US008203462B2

(12) United States Patent
Hope et al.

(10) Patent No.: US 8,203,462 B2
(45) Date of Patent: Jun. 19, 2012

(54) AUTOMATIC REGISTRATION OF METERS TO A CENTRALIZED DATA SYSTEM

(75) Inventors: Shaun Hope, Alameda, CA (US); Tom Hughes, Victoria (CA)

(73) Assignee: Schneider Electric USA, Inc., Palatine, IL (US)

( * ) Notice: Subject to any disclaimer, the term of this patent is extended or adjusted under 35 U.S.C. 154(b) by 764 days.

(21) Appl. No.: 12/345,370

(22) Filed: Dec. 29, 2008

(65) Prior Publication Data

US 2010/0164749 A1     Jul. 1, 2010

(51) Int. Cl.
*G08B 23/00*     (2006.01)
(52) U.S. Cl. .................................................. 340/870.02
(58) Field of Classification Search ............. 307/870.02; 340/870.02
See application file for complete search history.

(56) References Cited

U.S. PATENT DOCUMENTS

| | | | |
|---|---|---|---|
| 5,859,596 A | 1/1999 | McRae | |
| 5,897,607 A | 4/1999 | Jenney et al. | |
| 6,792,337 B2 | 9/2004 | Blackett et al. | |
| 6,819,098 B2* | 11/2004 | Villicana et al. | 340/870.02 |
| 7,868,740 B2* | 1/2011 | McNeely et al. | 340/286.07 |
| 2004/0122833 A1 | 6/2004 | Forth et al. | |
| 2007/0282495 A1 | 12/2007 | Kempton et al. | |
| 2008/0040295 A1 | 2/2008 | Kaplan et al. | |
| 2008/0224889 A1* | 9/2008 | Wyk et al. | 340/870.01 |
| 2008/0303344 A1* | 12/2008 | Matsuda et al. | 307/3 |

FOREIGN PATENT DOCUMENTS

| | | |
|---|---|---|
| EP | 1 850 109 | 10/2007 |
| WO | WO 03/084022 | 10/2003 |

OTHER PUBLICATIONS

Written Opinion corresponding to International Patent Application Serial No. PCT/2009/066931, dated Jan. 6, 2010, 5 pages.
International Search Report corresponding to International Patent Application Serial No. PCT/2009/066931, dated Jan. 6, 2010, 7 pages.

* cited by examiner

*Primary Examiner* — Michael Rutland Wallis
(74) *Attorney, Agent, or Firm* — Nixon Peabody LLP

(57) ABSTRACT

A system and methods for automatically configuring a monitoring device that is attachable to a network coupled to a data collection system. The network has associated network parameters. The monitoring device is coupled to an energy distribution system. The monitoring device measures a characteristic of energy supplied by the energy distribution system and stores data representative of the measured characteristics. A first network communications link is automatically established between the monitoring device and the network, and a host server is contacted to identify network parameters including an address of the data collection system. A second network communications link is automatically established between the monitoring device and the data collection system based on the address of the data collection system. Nameplate and configuration information associated with the monitoring device is communicated from the monitoring device over the network to the data collection system. The registration of the monitoring device in the data collection system is acknowledged based on acceptance of the nameplate information and the configuration information by the data collection system.

23 Claims, 5 Drawing Sheets

AUTOMATIC REGISTRATION OF METERS TO A CENTRALIZED DATA SYSTEM

FIELD OF THE INVENTION

Aspects disclosed herein relate generally to energy monitoring systems, and, in particular, to a system to automatically register and configure monitoring devices in a network-based energy monitoring system.

BACKGROUND

Microprocessor-based electrical power distribution equipment such as switchgear, switchboards, panelboards, and motor control centers accumulate considerable amounts of information concerning the electrical distribution systems to which they are connected, as well as the power equipment itself. Today's energy monitoring systems provide end-users with the capability to remotely monitor a variety of equipment via automatic monitoring devices. This allows more accurate data and decreases human resource requirements. Industrial automation, monitoring, energy management, and control systems include many microprocessor or microcontroller-based monitoring devices that communicate with each other, as well as with other computers, via various communications protocols such as the Ethernet for a local area network or the MODBUS® (hereafter "Modbus") communication protocol. The Modbus communication protocol is used with various slave devices that respond to read and write requests from a master controller. Among the features provided by this communication protocol is a means for the user to access data from either an RS-232 or RS-485 serial connection from the slave device to the master controller.

Recently, communications to a data collection system from monitoring devices has been implemented over a network using an Ethernet protocol, wrapped in a TCP/IP format, which provides the ability to access these devices from potentially anywhere via a network. Typically, monitoring devices such as meters are connected to points in an electrical distribution system and obtain data from that point in the electrical distribution system. The meter is also connected to the data collection system via the network; therefore, configuration is required in multiple places in the energy monitoring system. The meter is configured with detailed information required for the connection to the meter from the data collection system. The configuration information may be the mode of the meters, communications parameters, identification information, or other information required for the correct interpretation of the data collected by the meter. Conversely, configuration of the data collection system is required in order to access the meter and use the data sensed by the meter.

Currently energy consumers who wish to monitor their energy use through an energy monitoring system employ many different personnel who are responsible for meter configuration and installation. In addition, personnel must be employed to configure the data collection system for a new meter. The time and resources necessary to configure a meter and the data collection system also result in lost data if the time period between installation and configuration exceeds the capacity of the meter to record data.

Thus, the current meters require undesirable manual operation of configuring the data collection system in order to establish communication between the meter and the data collection system. The current energy monitoring systems require multiple locations where configuration must be performed. This results in a large amount of time necessary to activate a meter for data collection and transmission operations after physical installation of the meter into the energy monitoring system.

BRIEF SUMMARY

According to one example, a method of automatically configuring a monitoring device that is attachable to a network coupled to a data collection system is disclosed. The network has associated network parameters. The monitoring device is coupled to an energy distribution system. The monitoring device measures a characteristic of the energy distribution system and stores data representative of the measured characteristic. A first network communications link is automatically established between the monitoring device and the network to identify network parameters including an address of the data collection system. A second network communications link is automatically established between the monitoring device and the data collection system based on the address of the data collection system. Nameplate information and configuration information associated with the monitoring device is communicated over the network to the data collection system. The registration of the monitoring device in the data collection system based on acceptance of the nameplate information and the configuration information by the data collection system is acknowledged.

Another example is a system for automatic configuration of a monitoring device for measuring a characteristic of energy supplied by an energy distribution system. The system includes a network having associated network parameters. A data collection system is in communication with the network. A monitoring device is in communication with the network. The monitoring device measures the characteristic of energy supplied by the energy distribution system and stores data representative of the measured characteristic from the energy distribution system. The monitoring device is automatically configured for communicating the data to the data collection system by establishing a first network communications link between the monitoring device and a host server on the network to identify network parameters including an address of the data collection system. A second network communications link is established between the monitoring device and the data collection system based on the address of the data collection system. Nameplate information and configuration information associated with the monitoring device is communicated over the network to the data collection system. The monitoring device is registered in the data collection system by accepting the nameplate information and the configuration information.

Another example disclosed is a monitoring device that is automatically configurable when placed in communication with a network including a data collection system. The monitoring device includes a network interface for communication with the network. The monitoring device includes a data interface to obtain data from an energy distribution system and a data storage device. A controller establishes a network communications link between the monitoring device and the network to obtain network information. The controller contacts a host server to obtain network information. The address of the data collection system is obtained. Network communication between the monitoring device and the data collection system based on the address of the data collection system is obtained. Nameplate and configuration information is sent from the monitoring device over the network to the data collection system. The monitoring device sends the data obtained from the energy distribution system over the network to the data collection system.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
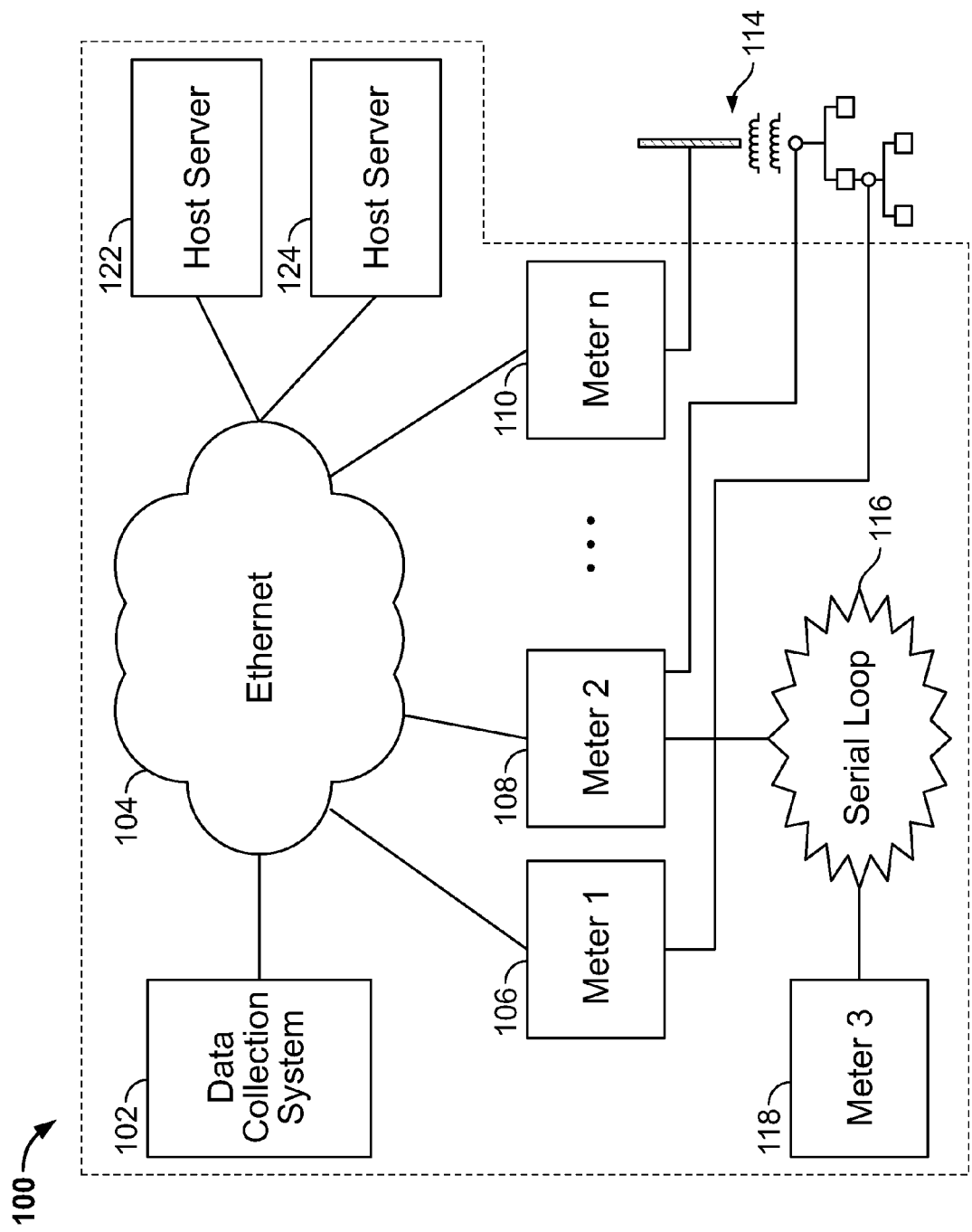
FIG. 1 is functional block diagram of a energy monitoring system that includes monitoring devices connected through a network, monitoring the characteristics of the energy distribution system.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 shows an example energy monitoring system 100 that includes a data collection system 102, a network 104, and a series of monitoring devices such as meters 106, 108, and 110. The meters 106, 108, and 110 are coupled to various points in an energy distribution system 114. The meters 106, 108, 110 measure characteristics of energy such as electricity supplied by the electrical distribution system 114 and store data representative of the measured characteristics. The centralized data collection system 102 in this example is a software system running on a computer or other controller device. The centralized data collection system 102 communicates to the meters 106, 108, and 110 via the network 104. It can be appreciated that the meters 106, 108 and 110 may also be any conventional microcontroller-based device, including a relay, a controller, a remote terminal unit (RTU), or a circuit monitor or power meter or relay device. As explained in more detail below, the circuit monitor or power meter, such as the meters 106, 108 and 110 may be based on a PowerLogic® Series 3000/4000 Circuit Monitor or a PowerLogic® ION7550/7650 Power and Energy Meter available from Schneider Electric.

The data collection system 102 periodically communicates with the monitoring devices such as the meters 106, 108, and 110 in the energy monitoring system 100 to gather data collected locally by the meters 106, 108, and 110. In this example, the data collection system 102 is responsible for initiating communication with monitoring devices such as the meters 106, 108, and 110. Of course, there may be networked data collection systems where the monitoring devices are responsible for pushing data periodically to the data collection system 102.

In this example, the network 104 is a local area network (LAN). Of course other network topologies such as a token ring or serial loop may be used. The network 104 may include the Internet, wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

The network 104 may further employ a plurality of wireless access technologies including, but not limited to, second (2G), third (3G) generation radio access for cellular systems, Wireless-LAN, Wireless Router (WR) mesh, and the like. Access technologies such as 2G, 3G, and future access networks may enable wide area coverage for mobile devices, such as client device 104 with various degrees of mobility. For example, the network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices may be remotely connected to either LANs or WANs via a modem and temporary telephone link. In essence, the network 104 includes any communication method by which information may travel between devices such as meters 106, 108, and 110, and the data collection system 102 and the like.

Additionally, the network 104 may include communication media that typically embodies computer-readable instructions, data structures, program modules, or other data in a modulated data signal such as a carrier wave, data signal, or other transport mechanism and includes any information delivery media. The terms "modulated data signal" and "carrier-wave signal" include a signal that has one or more of its characteristics set or changed in such a manner as to encode information, instructions, data, and the like, in the signal. By way of example, communication media may include wired media such as, but not limited to, twisted pair, coaxial cable, fiber optics, wave guides, and other wired media and wireless media such as, but not limited to, acoustic, RF, infrared, and other wireless media.

The monitoring devices such as the meters 106, 108, and 110 are used to measure characteristics and variables of the electrical distribution system 114. In this example, the monitoring devices such as the meters 106, 108, and 110 are power meters or circuit monitors. The energy distribution system 114 being monitored by the energy monitoring system 100 can be any of the five utilities designated by the acronym, WAGES, or water, air, gas, electricity, or steam in this example. The characteristics, which may include power, energy, volume per minute, volume, temperature, pressure, flow rate, or other characteristics of water, air, gas, electricity, or steam utilities, will then be recorded as data representing such measurements. The meters may be capable of storing data in onboard memory and are capable of communicating with the data collection system 102 via the network 104 to transmit measured parameters to the data collection system 102 for display, storage, reporting, alarming, and other functions. The monitoring devices must also be minimally capable of storing basic information in the form of setup parameters locally.

Each monitoring device, represented by the meters 104, 106 and 108 measures characteristics of the energy, and quantifies these characteristics into data that can be further analyzed by software. In the electrical context, the monitoring devices may be a PowerLogic® Series 3000/4000 Circuit Monitor or a PowerLogic® ION7550/7650 Power and Energy Meter available from Schneider Electric or any other suitable monitoring device such as an intelligent electronic device (IED), a metering device, or a power meter.

One or more of the monitoring devices such as the meter 108 may serve as a master device. In this example, the meter 108 serves as a master device and is connected to a secondary communications network such as a serial loop 116 in this example. Other devices, such as a meter 118, may be coupled to the serial loop 116, becoming "slave" devices. Such devices are not connected directed to the data collection system 102 but instead, communications with the data collection 102 are facilitated by the master device, such as the meter 108. For example, the data measured or monitored by the meter 118 may be output in Modbus format and sent serially via the serial loop 116 to the meter 108 acting as a master device. On receiving a read request from the meter 108, the summoned slave device such as the meter 118 sends its measured data over the serial loop 116 to the master device, meter 108, which sends it over the network 104 to the data collection system 102. Alternatively, control signals or data from the data collection system 102 may be written or sent to the slave devices such as the meter 118 via the master devices 108.

In this example, the master meter 108 communicates over the network 104 with the data collection system 102 and converts between the serial Modbus communications protocol associated with the slave devices such as the meter 118 on the serial loop 116 and the Ethernet TCP/IP protocol of the example network 104.

Additional devices may be coupled to the network 104 to provide additional network services. In this example, the network 104 is coupled to a first host server 122 and a second host server 124. The first host server 122 is configured for dynamic host configuration protocol (DHCP) services and is responsible for providing key network parameters to devices such as the meters 106, 108, and 110 that connect to the network 104 and request such parameter values from the first host server 122. Such parameters may include the IP address for the devices, the IP address of the domain name services server or servers on the network and the domain name of devices that are coupled to the network 104. The second host server 124 is configured to provide domain name services (DNS) and is responsible for resolving host names and IP address lookup requests. Of course it is to be understood that the host servers 122 and 124 may be separate physical devices or may be the same device, serving the two distinct functions (DHCP and DNS) described.

Figure 2:
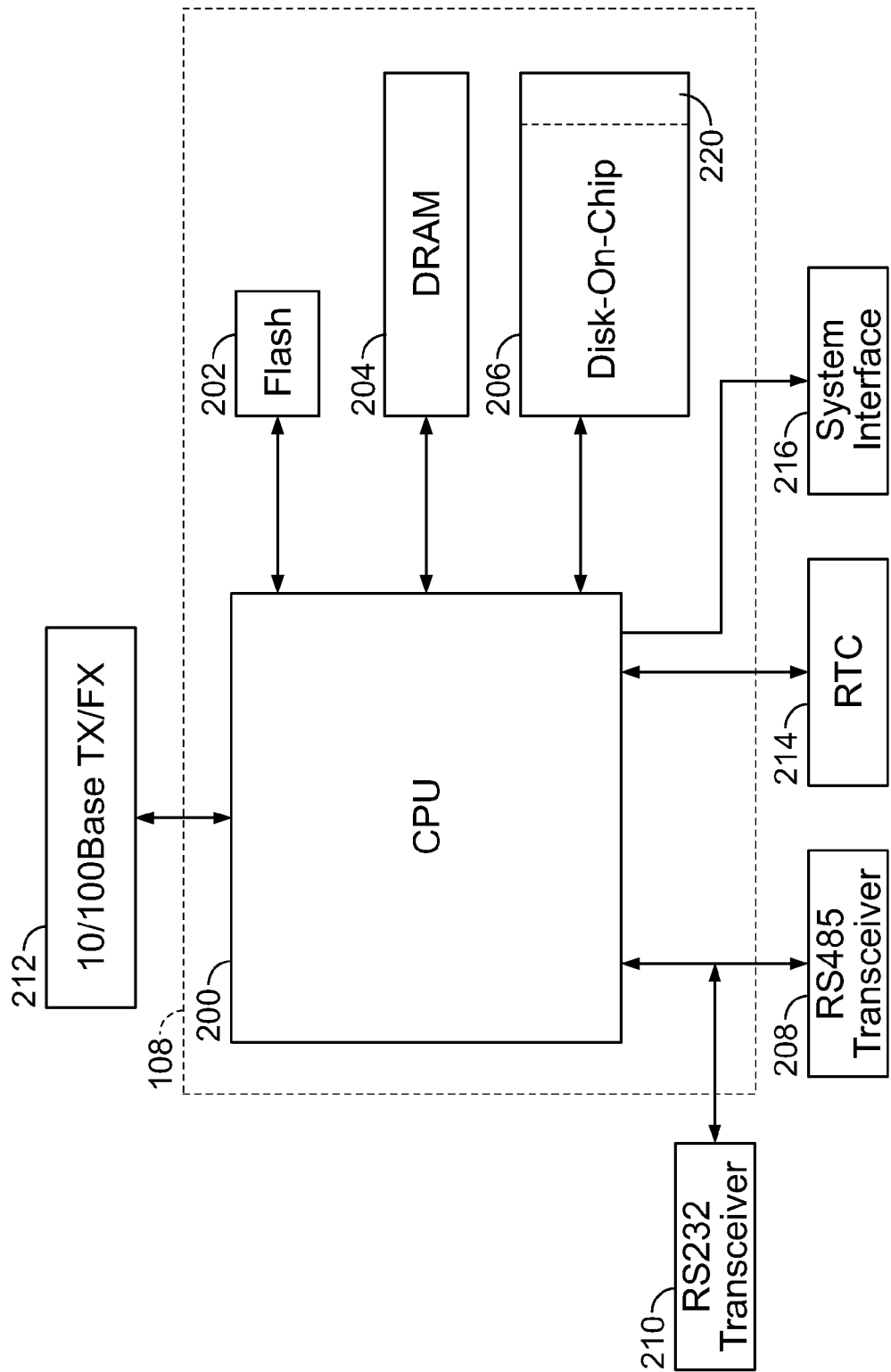
FIG. 2 is a functional block diagram of a monitoring device in FIG. 1 that also serves as a gateway device for other monitoring devices.

FIG. 2 is a block diagram of a meter such as the meter 108 in FIG. 1. The meter includes a CPU 200, a flash memory 202, a DRAM 204, a disk-on-chip memory 206, an RS-485 transceiver 208, an RS-232 transceiver 210, an Ethernet interface 212, a real time clock 214. The meter 108 may also include a current transformer or other energy system interface device 216, used to couple the meter 108 to the electrical distribution system 114 and to measure the characteristics of the point being monitored. The Ethernet interface 212 has one or more on-board Ethernet ports, e.g., one for a 10/100Base TX Twisted Pair connection and another for a 100Base Fx connection. The Ethernet interface 212 is coupled to the network 104 in FIG. 1. In this example, the RS-485 transceiver 208 has an RS-485 serial port for coupling the serial communications loop 116 to the slave devices such as the meter 118 shown in FIG. 1. The RS-485 port of the RS-485 transceiver 208 typically supports multiple devices without a repeater. Similarly, slave devices such as the meter 118 shown in FIG. 1 may alternately be coupled to a serial line coupled to the RS-232 transceiver 210. The real time clock 214 provides time data to stamp entries in a local data log 220, stored in the disk-on-chip memory 206 as will be explained below.

The processor 200 in FIG. 2 collects, stores, and distributes data measured by the meter 108. These functions may also be performed by respective processors of the meters 106 and 110 in FIG. 1 that do not serve any master controller functions. The processor 200 in this example also collects, stores, and distributes data relating to Modbus communications between the data collection system 102 and the slave devices of the utility data monitoring system 100 such as the slave devices such as the meter 118, received by the meter 108 through the transceiver 210 or transceiver 208 In these examples, the log 220 provides local storage of data collected by the meter 108 (whether by itself or from slave devices such as the meter 118) in the disk-on-chip memory 206 until the meter 108 is polled to send data to the data collection system 102 in FIG. 1. Alternatively, the log 220 may be stored in the flash memory 202. The log 220 may be subject to a first in first out (FIFO) procedure to handle an overflow of data. If the log 220 is full, the oldest entry will be discarded for a new log data entry. Alternatively, the log 220 may be subject to a fill-and-hold procedure whereby entries are recorded in the log 220 until the log 220 is full. Once the log 220 is full, no more entries will be recorded unless the user resets the log via the data collection system 102 in this example. Of course it is to be understood that the log may be reset locally via controls from the monitoring device itself. This is useful if the user wishes to download the data to another storage device with more capacity (such as a computer acting as the data collection system 102, for example) on a scheduled basis. The log 220 may then be cleared. This may give the user the option of storing all of the data recorded in the log 220 if downloading is done on a regular basis.

Figure 3:
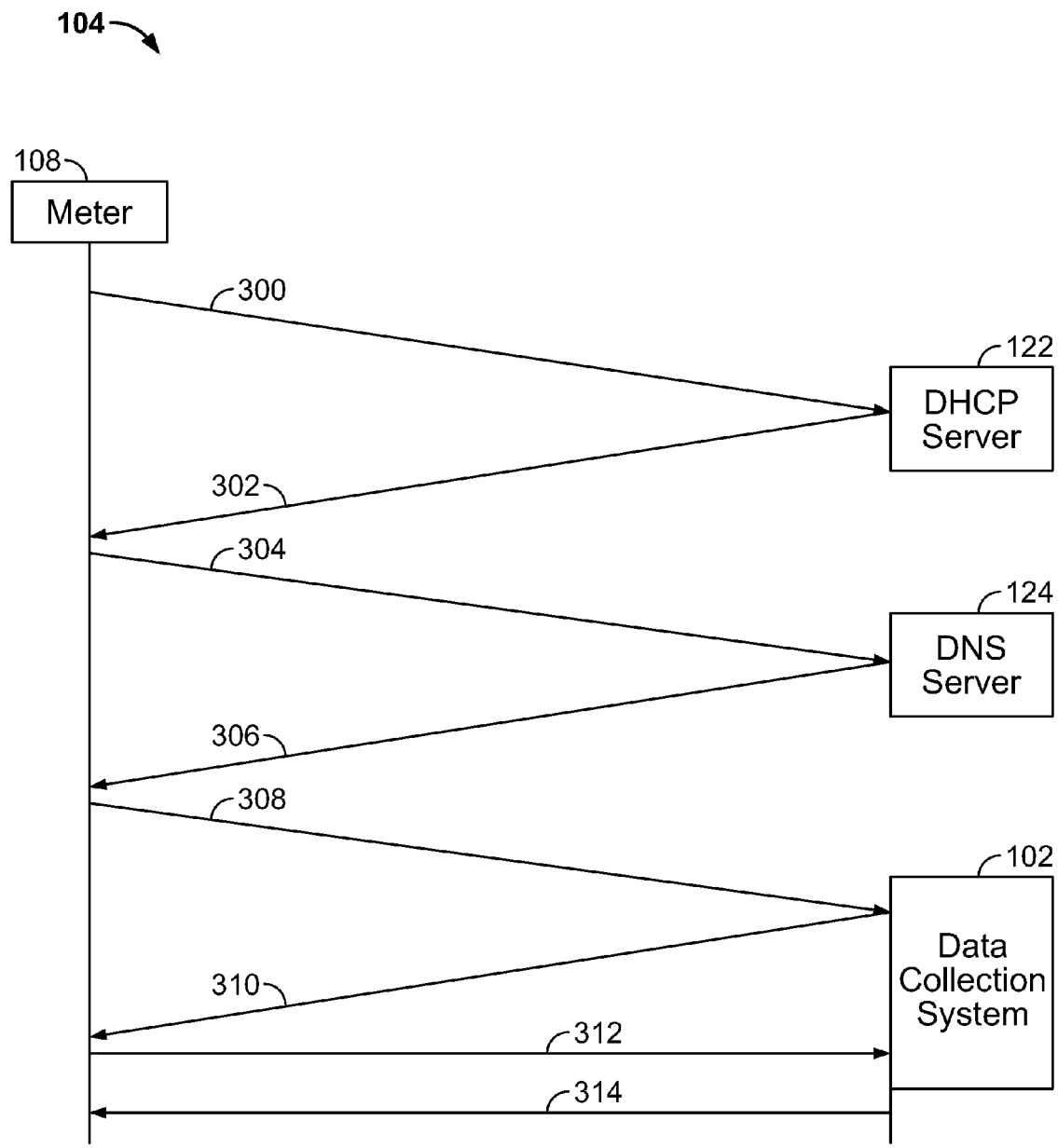
FIG. 3 is a functional block diagram of the communications involved in the automatic configuration of a monitoring device in FIG. 1.

FIG. 3 is a functional block diagram of the process whereby a monitoring device such as the meters 106, 108, and 110 may be automatically configured once they are connected to the energy distribution system 114 and placed in communication with the network 104 in FIG. 1. The process includes automatic transmission of key parameters to allow the monitoring device such as the meter 108 to become fully connected to the data collection system 102 as part of the overall energy monitoring system 100.

After the meter 108 is placed in communication with the network 104 (either physically or via a wireless communication medium), the meter 108 contacts the first host server 122 to receive network connection information (300). The DHCP service running on the first host server 122 allows devices such as the meter 108 to connect to the network without any operator having to configure the parameters in the meter 108. The DHCP service running on the first host server 122 responds (302) to the request 300 by the meter 108 with its IP address, the DNS server (124) addresses, and the domain name of the network 104 via the network 104. Since the meter 108 now has the DNS server information, the meter 108 may send a request (304) to the DNS server 124 to resolve the address of a known Fully Qualified Domain Name "FQDN" that represents the location of the data collection system 102. This FQDN could be pre-configured in the meter 108 or could be overridden with a specific value by the operator configuring the meter 108. The DNS server 124 responds (306) by sending the IP address of the data collection system 102 to the meter 108. On receiving the IP address of the data collection 102, the meter 108 establishes communication (308) with the data collection system 102 to register itself. In the registration request 308, the meter 108 provides both nameplate information and specific configuration information relating to itself. The nameplate information may include the context to the nature of the device, for example, the meter type, serial number, device name, and other free format information. The registration request 308 may also provide a user with context to the purpose of the meter 108 if certain free-format information from the meter 108 are configured within the device. The registration response 310 will provide an indication that the software is now aware of the meter 108, after which expected activities such as data collection will occur.

The specific configuration information provided in the registration request 308 may include the wiring mode (the specific method used to connect the meter to a three-phase electrical system) or other information that the data collection system 102 requires to correctly interpret data values sent by the meter 108. The data collection system 102 responds to the meter 108 to acknowledge that the meter 108 has been registered (310). After the registration, the data collection system 102 may make polling requests (312) via the network 104 to the meter 108. The meter 108 will receive the polling request 312 and send a response (314) with the requested data for storage and analysis by the data collection system 102.

The system described above assumes open access to the network 104. Of course, the principles described above may be applied to a secure or privately controlled network, and security measures may be implemented when connecting a new monitoring device such as the example meter 108 in FIG. 1 above. There may be a variety of secure methods of connecting monitoring devices that are to be automatically configured. One example of a secure connection is manual confirmation of the data collection system 102 for the monitoring device requesting registration. The data collection system 102 thus allows an operator to be presented with the basic information of the monitoring device that requests to be connected to the data collection system 102 in request 308. The operator of the data collection system 102 is asked to confirm the connection of the meter before the completion of the registration. If the operator confirms the registration, the response 310 from the data collection 102 is affirmative and the meter 108 is notified that it is successfully registered. If the operator refuses, the request is rejected and connection to the data collection system 102 will not be permitted for the meter.

Another secure connection alternative is minimal pre-configuration at the data collection system 102 to allow the monitoring device such as meter 108 to connect to the network 104. In this example, unique identification information such as the serial number of the new monitoring device is programmed into the data collection system 102 prior to the monitoring device requesting connection (308) to the data collection system 102. When the monitoring device requests connection and provides the serial number as in communication 308 in FIG. 3, the identification information is checked against the pre-configured list of acceptable monitoring devices in the data collection system 102. If the device information is on the list, the monitoring device is allowed to communicate with the data collection system 102. If the device information is not on the list, no communications with the data collection system 102 will be permitted for the monitoring device.

Another secure connection alternative is a minimal pre-configuration of the data collection system 102 that stores a password to allow connection to the data collection system 102. The monitoring device to be connected is configured with the data collection system password. During the communication 308 in FIG. 3, the monitoring device provides the password to the data collection system 102 to confirm the authenticity of the monitoring device. If the password is correct, the monitoring device is allowed to communicate with the data collection system 102. If the password is incorrect, no communications with the data collection system 102 will be permitted for the monitoring device. There are other variations of the technique described above in FIG. 3. In the case that the IP addresses of the monitoring device and the host server 122 are not provided by the DHCP mechanism, the addresses may be programmed into the monitoring device to be attached and thus the communications 300 and 302 in FIG. 3 are unnecessary.

Another variation is to configure the host server 122 to provide the location of the data collection server 102 in the initial DHCP request in communication 300 in FIG. 3. In such an instance, the communications 304 and 306 are unnecessary.

While this method describes how the standard services DNS and DHCP can be used as part of this system, variations exist whereby a different "client-server" mechanism could be created to provide the same effect. The monitoring device would broadcast, via the network 104, a "client request" to provide the IP address of the data collection system 102, and a server, connected to the network 104 and listening for such a request, would respond with a "server response" containing the address of the data collection system 102.

In the example in FIG. 1, there is a single data collection system 102 coupled to the network 104. Of course a network may include multiple data collection systems some or all of which are similar to the data collection system 102 in FIG. 1. With multiple data collection systems coupled to a network, a process is applied to determine which monitoring device a certain data collection system should contact for polling information or which data collection system a monitoring device should contact for sending information. One example of such a process is to allow each of the multiple data collection systems to have the capability to redirect the monitoring device to the address of another data collection system. In this process, a single data collection system is a master device that contains the information required to determine which monitoring devices should communicate with which data collection system on the network. The above process in FIG. 3 is thus modified in that response 310 would direct the meter to re-request a connection (request 308) from a different data collection system. This second, re-request 308 would result in a second response 310 (from the second, correct, data collection system) and operation would continue as described above.

Another process for use with multiple data collection systems on the network 104 may involve the monitoring devices being programmed with the specific FQDN of the data collection system in place of the generic known FQDN described in communication 304 in FIG. 3. In this case, communication 304 and 306 would be unnecessary.

Figure 4:
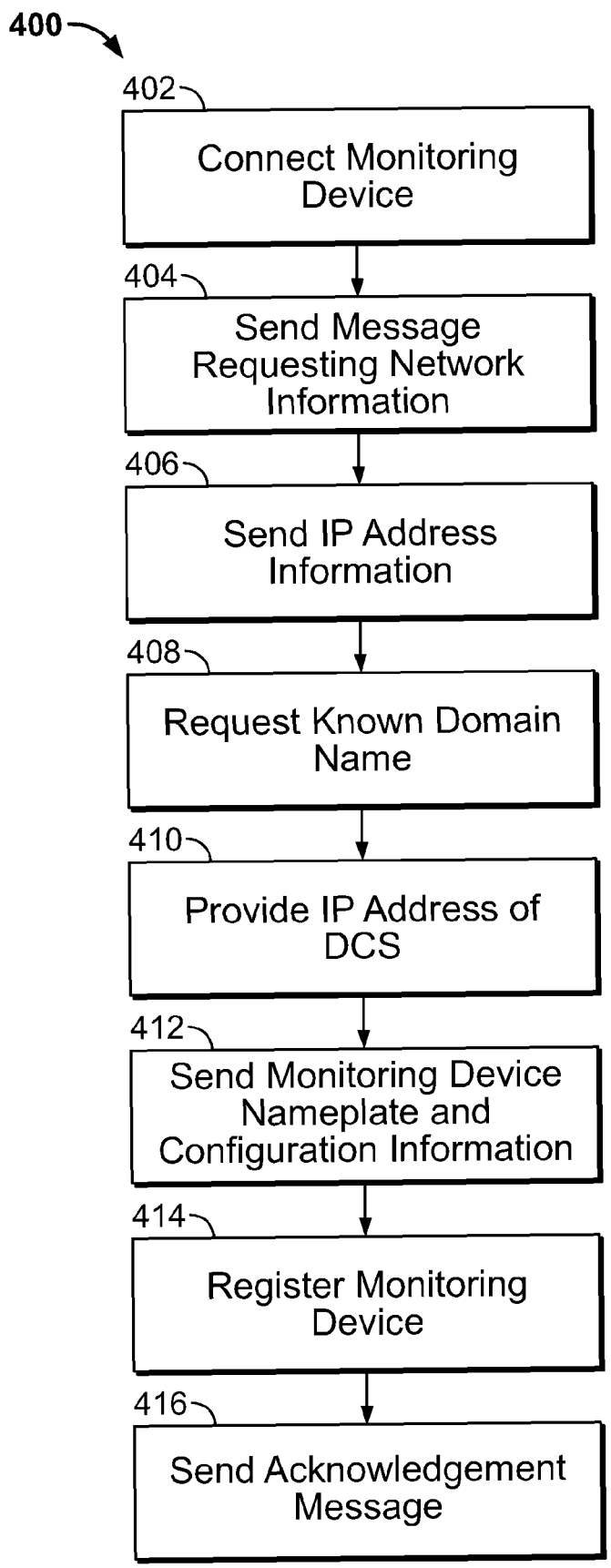
FIG. 4 is a flow diagram of an exemplary algorithm for automatic configuration of a monitoring device according to the aspects disclosed herein.

FIG. 4 is a flow diagram of components of an exemplary configuration algorithm 400 according to aspects disclosed herein. The configuration algorithm 400 may be run on the data collection system 102, meter 108, first host server 122, and second (DNS) host server 124, or a combination thereof The blocks shown in these figures need not be carried out in the order depicted nor must all of the blocks necessarily be carried out in all aspects. The configuration algorithm 400 configures monitoring devices such as the meter 108 that are initially coupled to the network 104 in FIG. 1.

A monitoring device such as a meter 108 in FIG. 1, is first physically coupled to the network 104 (402). The monitoring device then sends a message (300) over the network 104 to the host server 122 to obtain network connection information from the host server 122 (404) in response 302. The host server 122 responds (302) to the request (300) from the monitoring device with a message which may contain the IP address of the monitoring device, and contains the IP address of the DNS server 124, and the domain name of the network 104 (406). The monitoring device sends a request (304) to the DNS server 124 using the obtained IP address to request (304) the address of a known domain name (408).

The DNS server 124 responds (306) with a message to the monitoring device including the IP address of the data collection system 102 (410). The monitoring device, such as the meter 108, then uses the IP address to send a message (308) to the data collection system 102 to provide basic nameplate and configuration information (412) and request registration. The data collection system 102 receives the information and registers the monitoring device (414). The data collection system 102 then sends an acknowledgement message (310) to the monitoring device (416) indicating the monitoring device is now configured for communication with the data collection system 102.

As explained above, certain monitoring devices may be coupled to a master meter such as the meter 108 in FIG. 1. In the case of such slave meters, such meters communicate the information collected to the master meter, that then relays the information to the data collection system 102 via the network 104 in FIG. 1. In this example, the slave meters may be limited by the serial loop such as the serial loop 116 that allows the slave meter such as the meter 118 in FIG. 1 to poll or transmit information with more relative ease than meters on larger networks such as an Ethernet that may include hundreds or more network connected devices.

Figure 5:
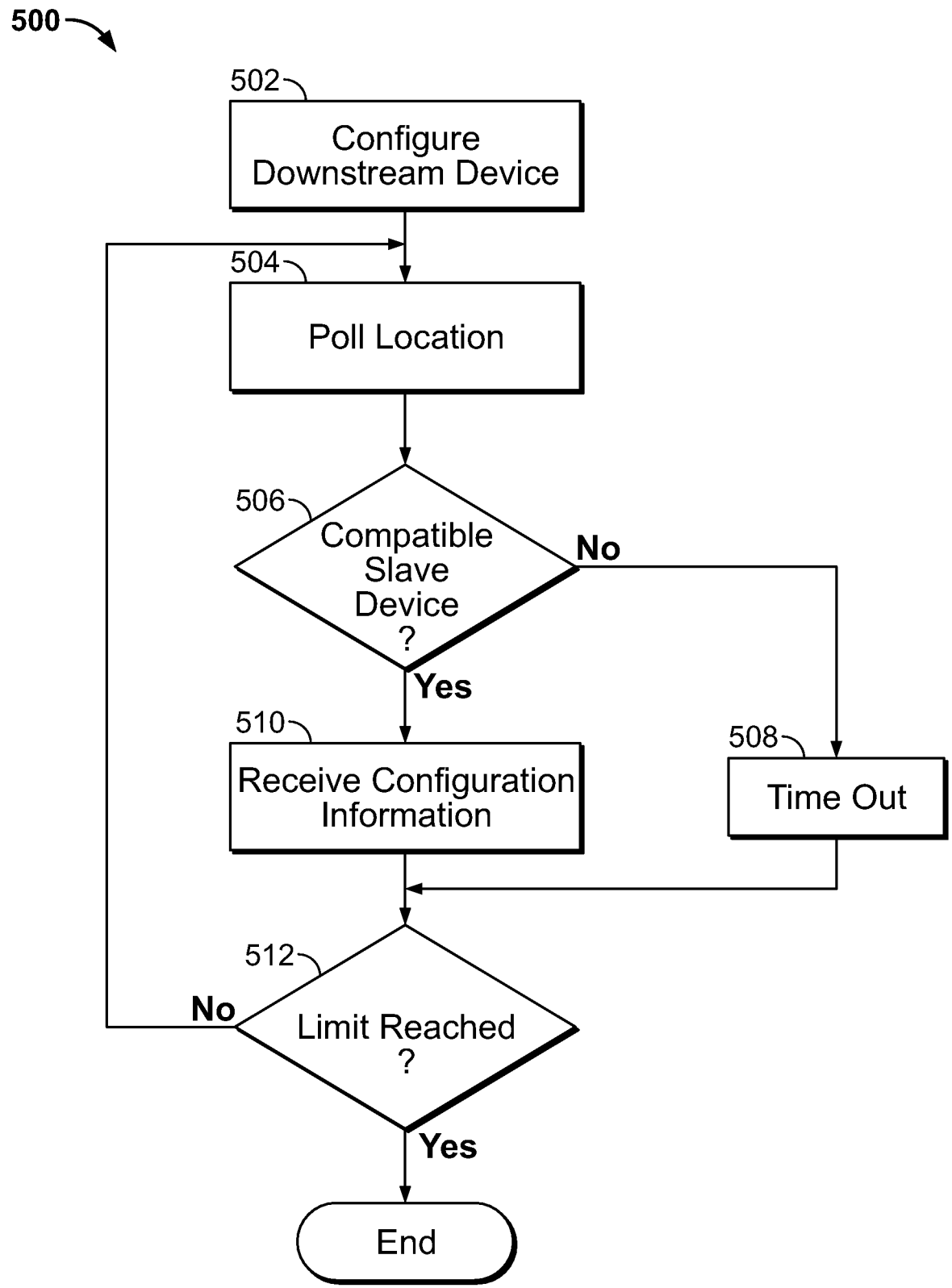
FIG. 5 is a flow diagram of the process of coupling a downstream monitoring device, or slave device, to a master device such as one of the monitoring devices in FIG. 1.

FIG. 5 is a flow diagram 500 of the process of coupling the slave meter such as the meter 118 in FIG. 1. The slave meter such as the meter 118 is first configured with the correct connection information such as the baud rate or parity to communicate on the serial loop 116 (502). The master meter such as the meter 108 in FIG. 1 then polls the first location on the serial loop 116 (504). The master meter determines whether there is a compatible slave meter in the first location on the serial loop 116 (506). If there is not a compatible slave meter in the first location, the request will timeout (508). If a compatible slave meter exists in the first location, the master meter will receive a response that includes the meter information such as the nameplate information and configuration data (510). The master meter will then determine whether the predetermined limit of devices has been reached (512). The predetermined limit may be a configured value, an intelligent value based on the number of addresses for a given protocol or derived such as if more than a certain number of locations do not respond, the limit is reached.

If the limit has not been reached and there are further locations (512), the master device will loop back and check the next location (504), repeating the process to determine if there is a compatible slave meter at that location (506) If there are no further locations, the master device completes the process. This process is repeated at regular, predetermined intervals to confirm that the slave meters are still online as well as to determine if any new slave meters have been added to the serial loop 116. As explained above, the information collected by the slave devices is transmitted with the information relating to the slave devices such as the meter 118 to the data collection system 102 by the master device 108.

Any of these algorithms include machine readable instructions for execution by: (a) a processor, (b) a controller, and/or (c) any other suitable processing device. It will be readily understood that a monitoring device includes such a suitable processing device. Any algorithm disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

One benefit of the automatic configuration of newly connected monitoring devices is the recovery after a catastrophic failure of the data collection system 102. In that circumstance, the data collection system failure results in loss of the setup information. However, the monitoring devices such as the meter 108 will be left in a state where they are no longer in communication with the data collection system 102. The monitoring devices may be configured so if no communication has occurred with the data collection system 102 for a predetermined period of time, the monitoring devices will reinitiate the setup process in FIG. 3. In this manner, a failed data collection system may be brought back online in a short period of time.

To facilitate the recovery process described, the monitoring device keeps an internal timestamp of the last time it communicated with the data collection system such as in the data log 220 in the memory 220 in FIG. 2. The monitoring device checks at predetermined and configurable intervals to see if the elapsed time between communications with the data collection system has exceeded a predetermined threshold value. If the limit has exceeded the threshold, a special message is sent to the data collection system 102 as described in 308. The message content in this variant on 308 queries whether the data collection system is present and informs the data collection system 102 to re-register the device as described in 412. If there is no response 310 to the inquiry, the configuration process in FIG. 3 is initiated.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of automatically configuring a monitoring device that is attachable to a network, the network coupled to a data collection system, the network having associated network parameters, the method comprising:
  coupling the monitoring device to an energy distribution system, the monitoring device measuring a characteristic of the energy distribution system and storing data representative of the measured characteristic;
  automatically establishing a first network communications link between the monitoring device and the network to identify network parameters to the monitoring device, the network parameters including an address of the data collection system;
  automatically establishing a second network communications link between the monitoring device and the data collection system based on the address of the data collection system, the second network communications link including identifying an address of the monitoring device to the data collection system;
  communicating nameplate information associated with the monitoring device and configuration information associated with the monitoring device from the monitoring device over the network to the data collection system; and
  acknowledging the registration of the monitoring device in the data collection system based on acceptance of the nameplate information and the configuration information by the data collection system.

2. The method of claim 1, wherein establishing the first network communications link includes coupling the monitoring device to the network via a wired or wireless connection.

3. The method of claim 1, further comprising authenticating the monitoring device to access the data collection system in connection with establishing the second network communications link.

4. The method of claim 1, wherein the monitoring device is a master device coupled to a serial loop coupled to a slave monitoring device.

5. The method of claim 1, wherein establishing the first network communications link includes obtaining the network parameters from a host server coupled to the network.

6. The method of claim 5, wherein the network parameters further include an address of a domain name server and a domain name for the network, the method further comprising obtaining the address of the data collection system from the domain name server based on the domain name.

7. The method of claim 1, further comprising periodically sending data representative of the measured characteristic received by the monitoring device to the data collection system.

8. The method of claim 7, wherein the monitoring device reestablishes the first network communications link and reestablishes the second network communications link if a request for the data stored on the monitoring device is not made from the data collection system for a predetermined period of time.

9. The method of claim 1, wherein the establishing the first network communications link includes obtaining from a host server an address of the monitoring device, an address of a domain name server, and a domain name associated with the network, the method further comprising:
  communicating the domain name to the domain name server and receiving from the domain name server the address of the data collection system; and
  receiving at the monitoring device an indication that the monitoring device has been registered by the data collection system.

10. The method of claim 1, wherein establishing the first network communications link includes obtaining the address of the data collection system from a host server.

11. The method of claim 1, further comprising storing an address of the monitoring device in the monitoring device and an address of a host server or the address of the data collection system in the monitoring device.

12. A system for automatic configuration of a monitoring device for measuring a characteristic of energy supplied by an energy distribution system, the system comprising:
  a network having associated network parameters;
  a data collection system in communication with the network;
  a monitoring device in communication with the network, the monitoring device measuring the characteristic of energy supplied by the energy distribution system and storing data representative of the measured characteristic; and
  wherein the monitoring device is automatically configured for communicating the data to the data collection system by establishing a first network communications link between the monitoring device and a host server on the network to identify network parameters to the monitoring device, the network parameters including an address of the data collection system; establishing a second network communications link between the monitoring device and the data collection system based on the address of the data collection system, the second network communications link including identifying an address of the monitoring device to the data collection system; communicating nameplate information associated with the monitoring device and configuration information associated with the monitoring device from the monitoring device over the network to the data collection system; and registering the monitoring device in the data collection system by accepting the nameplate information and the configuration information.

13. The system of claim 12 wherein the communication between the monitoring device and the network occurs over a wired or wireless connection.

14. The system of claim 12, wherein the monitoring device is authenticated in connection with establishing the second network communication link.

15. The system of claim 12, further comprising a slave monitoring device coupled to the monitoring device via a serial loop, wherein the monitoring device serves as a master device.

16. The system of claim 12, further comprising a host server in communication with the network, wherein the first network communications link includes obtaining network parameters from the host server.

17. The system of claim 12, further comprising a domain server, wherein the address of the data collection system is obtained by the monitoring device from the domain server.

18. The system of claim 17, wherein the network parameters further include an address of a domain name server and a domain name for the network, wherein the address of the data collection system is obtained from the domain name server based on the domain name.

19. The system of claim 18, wherein the monitoring device receives an indication that the monitoring device has been registered by the data collection system.

20. The system of claim 12, wherein the monitoring device periodically sends data representative of the measured characteristic received from the energy distribution system to the data collection system.

21. The system of claim 20, wherein the monitoring device reestablishes the first network communications link and reestablishes the second network communications link if a request for the data stored on the monitoring device is not made from the data collection system for a predetermined period of time.

22. The system of claim 16, wherein the monitoring device stores an address of the monitoring device, and an address of the host server or the address of the data collection system.

23. A monitoring device that is automatically configurable when placed in communication with a network including a data collection system, the monitoring device comprising:
   a network interface for communication with the network;
   a data interface to obtain data from an energy distribution system;
   a data storage device; and
   a controller that establishes a network communications link between the monitoring device and the network, contacts a host server to obtain network information, obtains the address of the data collection system from the network information, establishes network communication between the monitoring device and the data collection system based on the address of the data collection system, the network communication including an address of the monitoring device sends nameplate and configuration information from the monitoring device over the network to the data collection system to register the monitoring device in the data collection system by the data collection system accepting the sent nameplate information and the configuration information, and sends the data obtained from the energy distribution system over the network to the data collection system.

* * * * *